March 16, 1948.   H. E. VAN NESS   2,437,843
RESILIENT BUSHING
Filed June 6, 1945
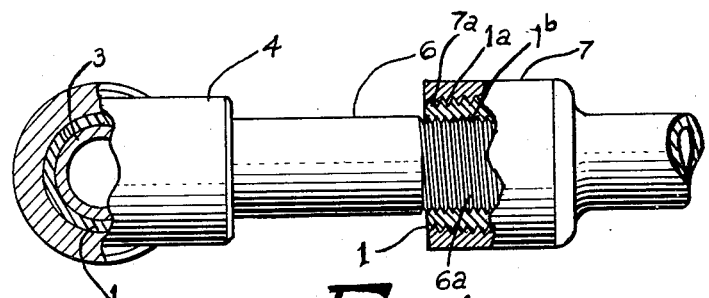
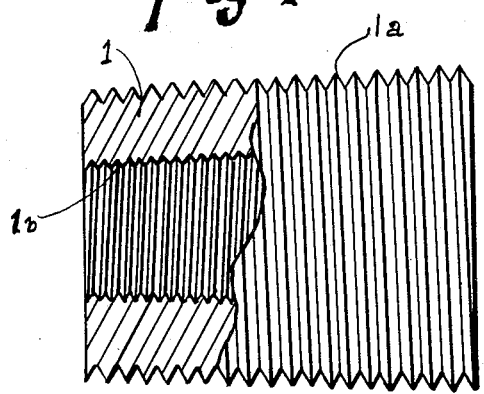
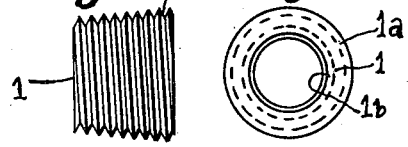
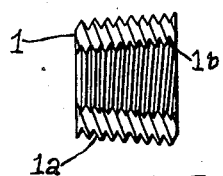
INVENTOR
HENRY E. VAN NESS
BY
ATTORNEYS Patented Mar. 16, 1948

2,437,843

UNITED STATES PATENT OFFICE 2,437,843

RESILIENT BUSHING

Henry E. Van Ness, Elmira, N. Y.

Application June 6, 1945, Serial No. 597,741

2 Claims. (Cl. 285—160)

My invention relates to improvements in resilient bushings, rings, or collars adapted to hold the ends of two pieces of pipe, rods, or the like together, and the principal object thereof is to provide a resilient bushing, ring or collar adapted to be inserted between the threaded ends of two pieces of pipe, rod or other parts to resiliently hold the pieces together in such manner that one or both ends of the parts will be efficiently supported by the connection at the threaded ends of the pieces.

Another object of my invention is to provide a resilient bushing, ring, or collar adapted to make a connection between the tapered threaded ends of pipes, rods, or other parts which will permit the free ends of the parts to be swung or swiveled, while the bushing will maintain sufficient pressure or any pressure desired between the threaded ends to steady the parts in their swiveled positions.

A further object of my invention is to provide a novel bushing, ring, or collar of the above type which will, in addition to the above mentioned features, impart flexibility to the joints; will maintain constant pressure or any pressure desired between the threaded ends so that the parts will remain in proper position; will prevent gas or liquid leaks at the connection; and will have long life; also will be economical to manufacture.

Other minor objects and advantages of my invention will be hereinafter set forth in the following description.

In the accompanying drawings, forming a part of this specification, like numerals are employed to designate like parts, throughout the same.

In said drawings:

Figure 1 is a plan view, partly in section, showing elements such as pipe sections having threaded ends, connected together by my resilient bushing, ring or collar, and showing the threads on the inner and outer walls of the bushing engaging the tapered threads on the said pipe sections.

Fig. 2 is a side elevation, partly in section, showing my novel resilient bushing, ring, or collar, detached.

Fig. 3 is a reduced side elevation of the bushing detached.

Fig. 4 is an end view of the bushing shown in Fig. 3.

Fig. 5 is a longitudinal section through the bushing shown in Fig. 3.

In the drawing, wherein for the purposes of illustration preferred embodiments of my invention are shown, the numeral 1 designates my resilient bushing, ring, or collar, same being of a slightly conical shape and provided with threads in its inner and outer walls. The taper of the conical walls of bushing 1 may be of any desired amount or degree to suit the particular pipe couplings or fittings to be connected together.

In Fig. 1, one resilient bushing 1 is disposed or confined between pipe fittings 6 and 7 which have tapered threads pitched to standard, or other desired tapers, the female fitting 7 being of larger diameter than the male fitting 6.

Bushing 1 is made of any flexible sealing or packing material having a resiliency which may be soft or approach rigidity yet capable of absorbing vibration, bushing 1 being provided with external threads 1a on the tapered outer wall corresponding in size and pitch with those of the internal threads 7a of the female pipe fitting 7 as shown in Fig. 1, although the pitch and size of the threads 1a may vary thereupon. The threads 1a extend the full length of the bushing 1. The internal wall of bushing 1 is also provided with threads 1b extending the full length of the bushing, said threads 1b having a size and pitch corresponding with those of the external threads 6a of the male fitting 6. However, the threads 1b may have a different size and pitch from those of threads 6a, if desired.

In assembling the parts, the pipe fittings 6 and 7, with the bushing 1 previously mounted in or on one fitting, are rotated relatively to confine and compress the bushing 6a therebetween with the threads 1a, 1b of the bushing 1 directly engaging the threads 7a, 6a of the fittings as shown; and owing to the taper of the threads of the bushings and fittings, the further fittings 6 and 7 are screwed together, the more tightly will the resilient bushing 1 be compressed between the pipe fittings, and the bushing will thus form a resilient connection between fittings 6 and 7, permitting the fittings to be rotated while still maintaining a sealing pressure between the parts at the joint. The bushing, being confined between the parts 6 and 7, maintains a full opening through the fittings for the passage of liquids or the like; and hence the fittings may be used as fluid or gas conduits; or for receiving electric wiring since the bushings are or may be made of electric insulating material.

Due to the pitch of the threads of the interengaging parts, there is an advancing or retracting movement of the fittings 6, 7 when one member is rotated but such movement will not affect the seal within normal rotating movements. The engagement of the external and internal threads on the bushing, with threads on the fittings 6 and 7 prevents leakage between the parts of the joint, and furthermore, prevents the fittings 6 and 7 when connected together by bushing 1 from pulling apart, while permitting, however, the fittings to be freely swiveled or rotated through any normal angular degree short of separation of the fittings. As wear between the parts occurs, the fittings 6, 7 may be rotated relatively to take up any looseness. Moreover, the bushing 1 forms a cushion between the fittings 6 and 7.

My novel bushing, while resiliently holding the fittings 6 and 7 together, due to its compression, provides a movable joint which will hold the fittings in adjusted or proper relation when supported only at the connection, thus leaving the outer ends of one or both fittings 6, 7 free to be manipulated, swiveled or rotated as desired without causing leakage or loosening of parts at the joint. Thus, my bushing may be readily adapted for use in connecting pipe sections of machine tools, which sections feed lubricant to rotating parts and which must normally be constantly swung or rotated into different angular positions, since the bushing maintains a sealing pressure between the parts sufficient to hold the parts in adjusted angular position due to friction between the parts. Thus the pipes connected by my invention will remain in any adjusted position without loss of pressure within the pipes, even when one end only of the pipes is supported at or by the joint.

The bushing may have any flexibility up to relative rigidity and still be removable; and when wear takes place due to movement between the fittings, said wear can be taken up the same as any pipe fitting due to taper of the threads, by merely rotating one fitting relative to the other to further compress the bushing therebetween.

The bushing may also be made of material such as fabric or plastic which will be proof against the acids of fluids or gases passing through the pipes. Also the bushing may be made of material which will resist oils, and which will be not affected by heat up to temperatures of about 300° F.

Another important feature of the bushing is that same is renewable. As the bushing 1 is made of material which will not adhere to either fitting 6, 7, the said bushing may be readily removed and replaced; and if made of heat-resisting material the bushing may be used in exhaust pipe connections.

Figure 1 also shows a resilient bushing 1 disposed between pipe or other fittings arranged in a right-angle relationship, the fittings being denoted by the reference numerals 3 and 4 in which one element 4 is arranged for swinging throughout an arc of 360 degrees with relation to the other element 3 instead of the straight-line rotary movement permitted between the elements 6 and 7. One turn of the fitting 3 or 4, however, will serve to take up any wear between the bushing and the elements, due to wear owing to the taper of the threads in order to maintain the joints sealed and at the same time give flexibility also withstand a greater amount of vibration and the other characteristics to the joint or connection hereinbefore mentioned.

I do not limit my invention to the exact forms shown in the drawing, for obviously changes may be made therein within the scope of the claims.

I claim:

1. In a joint between telescopic pipe or rod ends having internal and external screw threads respectively, means for sealingly connecting the ends together comprising a resilient bushing of rubber-like material having external and internal threads on its outer and inner walls respectively engaging those of the pipe or rod ends respectively.

2. In a joint as set forth in claim 1, the inner and outer walls of the bushing being conical.

HENRY E. VAN NESS.

REFERENCES CITED

The following references are of record in the file of this patent:

UNITED STATES PATENTS

| Number | Name | Date |
| --- | --- | --- |
| 351,605 | Kennedy | Oct. 26, 1886 |
| 556,215 | Schmidt | Mar. 10, 1896 |
| 1,115,912 | Dodson | Nov. 3, 1914 |
| 1,372,876 | Freund | Mar. 29, 1921 |
| 1,471,045 | Maupin et al. | Oct. 16, 1923 |
| 2,107,806 | Roach | Feb. 8, 1938 |
| 2,407,553 | Hoesel | Sept. 10, 1946 |